(12) United States Patent
Wang

(10) Patent No.: US 11,256,842 B2
(45) Date of Patent: Feb. 22, 2022

(54) SIMULATION METHOD, SIMULATION DEVICE AND READABLE STORAGE MEDIUM

(71) Applicant: Shanghai Huahong Grace Semiconductor Manufacturing Corporation, Shanghai (CN)

(72) Inventor: Zhengnan Wang, Shanghai (CN)

(73) Assignee: Shanghai Huahong Grace Semiconductor Manufacturing Corporation, Shanghai (CN)

( * ) Notice: Subject to any disclaimer, the term of this patent is extended or adjusted under 35 U.S.C. 154(b) by 0 days.

(21) Appl. No.: 16/911,326

(22) Filed: Jun. 24, 2020

(65) Prior Publication Data

US 2021/0124862 A1    Apr. 29, 2021

(30) Foreign Application Priority Data

Oct. 25, 2019    (CN) .......................... 201911025744.8

(51) Int. Cl.
*G06F 30/367* (2020.01)
*G06F 119/06* (2020.01)

(52) U.S. Cl.
CPC ........ *G06F 30/367* (2020.01); *G06F 2119/06* (2020.01)

(58) Field of Classification Search
CPC ........ G06F 30/367; G06F 30/33; G06F 30/30; G06F 30/20; G06F 30/36
See application file for complete search history.

(56) References Cited

U.S. PATENT DOCUMENTS

| 5,352,973 | A | * | 10/1994 | Audy | .................. G05F 3/30 323/313 |
| 2019/0163853 | A1 | * | 5/2019 | Dutta | .................. G06F 30/30 |

\* cited by examiner

*Primary Examiner* — Justin C Mikowski
*Assistant Examiner* — Cuong V Luu
(74) *Attorney, Agent, or Firm* — Murtha Cullina LLP

(57) ABSTRACT

A simulation method, simulation device and a readable storage medium are disclosed, in which a correction circuit is added to an equivalent circuit model for a three-terminal circuit employed in a SPICE simulation system. The correction circuit enables simulating behavior of the resistor module, enabling the SPICE simulation system to take in account the body effect. Therefore, simulation results obtained from the simulation model and simulation parameters for the resistor module can better reflect resistor behavior with body effect in an actual circuit, resulting in effectively improved simulation accuracy of the SPICE simulation system and allowing the system to provide more accurate circuit simulation results. Fitting tests can be performed to obtain first-order, second-order and resistor-width-dependent correction coefficients for a body voltage of the resistor module. Thus dependence of resistor behavior on the body voltage can be better predicted, allowing a good reflection of resistor behavior with body effect.

8 Claims, 4 Drawing Sheets

SIMULATION METHOD, SIMULATION DEVICE AND READABLE STORAGE MEDIUM

CROSS-REFERENCES TO RELATED APPLICATIONS

This application claims the priority of Chinese patent application number 201911025744.8, filed on Oct. 25, 2019, the entire contents of which are incorporated herein by reference.

TECHNICAL FIELD

The present invention relates to the field of electrical circuit simulation and, in particular, to a simulation method, simulation devices and a readable storage medium.

BACKGROUND

In bipolar-CMOS-DMOS (BCD) processes, p-wells are formed not only as necessary process layers of active devices but also often as resistors of passive devices, also known as p-well resistors. As shown in FIG. 1, such a p-well resistor usually has three terminals: two terminals 1, 2 functioning respectively as high-voltage and low-voltage bias terminals of a regular resistor; and an n-isolated terminal 3 leading from an n-buried layer beneath the p-well via an n-well and an N+ region. As a circuit incorporating such a resistor is operating, voltages at each of the high-voltage and low-voltage bias terminals 1, 2 are lower than that at the n-isolated terminal 3. In practice, a designer sometimes also applies a high voltage to the n-isolated terminal 3 of such a p-well resistor. This external voltage can deplete the n-buried layer and p-well, leading to a reduced effective area of the current flowing in the p-well resistor and an increased resistance of the well resistor, and the extent of depletion and thus the resistor's resistance varies with the magnitude of the external voltage applied to the n-isolated terminal 3. This phenomenon is the so-called body effect. All resistor models included in SPICE, a simulator employed used in the art, support performance simulation of only two-terminal resistors but not those with the body effect, and as shown in FIG. 2, such simulation is based on the following resistance expression:

$$\text{Reff}=\text{Rsh}*(W-2dw)/L*(1+TC_1*\Delta T+TC_2*\Delta T^2)*(1+PVC_1*\Delta V(1,2)+PVC_2*\Delta V(1,2)^2)$$

where Rsh represents a sheet resistance; W, a layout width of the p-well; L, a layout length of the p-well; $\Delta T$, a temperature difference; $\Delta V(1,2)$, a voltage difference between the resistor's terminals 1 and 2; $TC_1$, a first-order temperature correction coefficient; $TC_2$, a second-order temperature correction coefficient; $PVC_1$, a first-order voltage correction coefficient; and $PVC_2$, a second-order voltage correction coefficient. As shown in FIG. 3, due to the body effect, a resistor exhibits I-V characteristics depending on the body voltage. FIG. 3 shows the dependence of a current Ir flowing in a p-well resistor on a voltage difference between the terminals 1 and 2 of the p-well resistor at various body voltages applied to the n-buried layer. Specifically, this figure shows I-V profiles at body voltages of 0V, 8V, 16V and 24V.

Chinese Patent Application Publication No. CN103838927B discloses a SPICE circuit simulation model, method and device for a resistor module. The SPICE circuit simulation model includes terminal-to-terminal parasitic capacitances coupled between body terminals of adjacent intrinsic resistor model blocks, and SPICE simulation parameters for the resistor module include distances between body terminals of adjacent intrinsic resistor model blocks, terminal counts of resistors in the resistor module and how the resistors are coupled to one another. Therefore, the simulation results obtained from the SPICE circuit simulation model and SPICE simulation parameters for the resistor module better reflect relative physical positional and electrical relationships between multi-terminal resistors in the real circuit. In other words, this model introduces parasitic capacitances and connections thereof, which cannot be extracted using a parasitic extraction tool, and can thus better reflect the relative physical positional and electrical relationships between the resistors in the real circuit and provide more accurate circuit simulation results.

The solutions that have been proposed so far do not support the simulation of a p-well resistor with the body effect and cannot accurately predict by the corresponding simulation systems how a p-well resistor behaves with the body effect.

Therefore, there is a need for a solution taking into account the body effect of such a resistor.

SUMMARY OF THE INVENTION

It is an objective of the present invention to overcome the problems associated with the prior art, i.e., not supporting the simulation of a p-well resistor with the body effect and being incapable of accurately predict by a simulation system how a p-well resistor behaves with the body effect, by providing a simulation method, simulation devices and a readable storage medium.

To this end, in a first aspect of the present invention, there is provided a simulation method for establishing a simulation model for a resistor module in a SPICE simulation system, the simulation method including the steps of:

S1) acquiring a simulation model for the resistor module, the simulation model including a first resistor, a second resistor, a first parasitic diode, a second parasitic diode and a correction circuit, the first and second resistors configured to simulate resistors in the resistor module, the first and second parasitic diodes configured to simulate parasitic diodes of an n-buried layer for a p-well in the resistor module, the correction circuit configured to simulate a body effect on the resistor module; S2) acquiring simulation parameters for the resistor module; and S3) performing a SPICE simulation based on the simulation model and the simulation parameters.

Optionally, in S1), the correction circuit may include a first correction resistor, a second correction resistor, a first voltage supply and a second voltage supply, wherein:

the first correction resistor, the first resistor, the second resistor and the second correction resistor are connected sequentially in series to form a series circuit;

the first voltage supply is connected in parallel to the first correction resistor, and the second voltage supply is connected in parallel to the second correction resistor; and the first parasitic diode and the second parasitic diode are connected to respective ends of the series circuit.

Optionally, in S2), the simulation parameters may include a first correction coefficient, a second correction coefficient and a third correction coefficient, wherein:

the first correction coefficient is a first-order voltage correction coefficient for a body voltage of the resistor module, the second correction coefficient is a second-order voltage correction coefficient for the body voltage of the resistor module, and the third correction coefficient is a resistor-width-dependent correction coefficient for the body voltage of the resistor module; and the first, second and third correction coefficients are obtained from a fitting test.

Optionally, the resistor module may be a p-well resistor having a first terminal, a second terminal and a third terminal, the first terminal serving as a high-voltage bias terminal of the p-well resistor, the second terminal serving as a low-voltage bias terminal of the p-well resistor, the third terminal serving as an n-isolated terminal of the p-well resistor, wherein the first voltage supply is configured to provide a voltage satisfying $$ex_1=(1+p_1*\max(abs(v(3,1)),abs(v(3,2)))*(1-p_3/w^2)+p_2*\max(abs(v(3,1)),abs(v(3,2)))^{2}*(1-p_3/w^2)*(1-p_3/w^2))$$

where $ex_1$ represents the voltage provided by the first voltage supply; $p_1$ represents the first correction coefficient; $p_2$ represents the second correction coefficient; $p_3$ represents the third correction coefficient; w represents a width of a layout of the p-well in the p-well resistor; $v(3,1)$ represents a voltage difference between the third and first terminals; and $v(3,2)$ represents a voltage difference between the third and second terminals.

Optionally, the second voltage supply may be configured to provide a voltage equal to the voltage provided by the first voltage supply.

Optionally, in the SPICE simulation system, the fitting test may be performed based on respective comparisons between actual measurement data and simulation data to refine the first, second and third correction coefficients until the simulation data become the same as the respective actual measurement data.

Optionally, resistances of the first and second correction resistors may be adjusted based on a magnitude of a bias voltage of the resistor module.

In a second aspect of the present invention, there is provided a simulation device for establishing a simulation model for a resistor module in a SPICE simulation system, the simulation device including:

a simulation model acquisition unit for acquiring a simulation model for the resistor module, the simulation model including a first resistor, a second resistor, a first parasitic diode, a second parasitic diode and a correction circuit, the first and second resistors configured to simulate resistors in the resistor module, the first and second parasitic diodes configured to simulate parasitic diodes of an n-buried layer for a p-well in the resistor module, the correction circuit configured to simulate a body effect on the resistor module;

a simulation parameter acquisition unit for acquiring simulation parameters for the resistor module; and a simulation processing unit for performing a SPICE simulation based on the simulation model and the simulation parameters.

Optionally, the simulation parameter acquisition unit may be configured to acquire a first correction coefficient, a second correction coefficient and a third correction coefficient, wherein the first correction coefficient is a first-order voltage correction coefficient for a body voltage of the resistor module, the second correction coefficient is a second-order voltage correction coefficient for the body voltage of the resistor module, and the third correction coefficient is a resistor-width-dependent correction coefficient for the body voltage of the resistor module; and wherein the first, second and third correction coefficients are obtained from a fitting test.

In a third aspect of the present invention, there is provided a simulation device including a memory, a processor and a computer program stored on the memory and executable by the processor, wherein upon execution of the computer program, the processor carries out the simulation method as defined in any of the above paragraphs.

In a fourth aspect of the present invention, there is provided a readable storage medium storing thereon a computer program, wherein the simulation method as defined in any of the above paragraphs is carried out when the computer program is executed by a processor.

Different from the prior art, in the proposed simulation method, simulation devices and readable storage medium, a correction circuit is added to an equivalent circuit model for a three-terminal circuit employed in a SPICE simulation system. The correction circuit enables simulating behavior of the resistor module in the presence of the body effect, enabling the SPICE simulation system to take in account the body effect. Therefore, simulation results obtained from the simulation model and simulation parameters for the resistor module can better reflect resistor behavior with body effect in an actual circuit, resulting in effectively improved simulation accuracy of the SPICE simulation system and allowing the system to provide more accurate circuit simulation results.

Moreover, fitting tests can be performed to obtain a first-order voltage correction coefficient, a second-order voltage correction coefficient and a resistor-width-dependent correction coefficient for a body voltage of the resistor module. In this way, dependence of resistor behavior on the body voltage can be better predicted, allowing a good reflection of resistor behavior with body effect.

10-simulation device; 101-simulation model acquisition unit; 102-simulation parameter acquisition unit; 103-simulation processing unit; 11-first terminal; 12-second terminal; 13-third terminal.

DETAILED DESCRIPTION

Specific embodiments of the present invention will be described in greater detail below with reference to the accompanying schematic drawings. Features and advantages of the invention will be more apparent from the following detailed description. Note that the figures are provided in a very simplified form not necessarily presented to scale, with their only intention to facilitate convenience and clarity in explaining the embodiments.

In this specification, orientation and position relationships described with the terms "central", "upper", "lower", "left", "right" and the like are understood to be based on the orientation and position relationships shown in the figures. They are intended merely to facilitate and simplify the explanation of the invention and do not indicate or imply the stated components or elements have to assume, or be constructed or operated in, particular orientations. Therefore, they are not to be construed as limiting the invention.

In addition, the terms "first", "second", etc. are used herein only for the purpose of illustration and are not to be construed as indicating or implying relative importance or implicitly indicating the number of the stated features. Therefore, a feature described with "first", "second" or the like can explicitly or implicitly indicate the presence of one or more such features. As used herein, the term "plurality" has the meaning of "two or more", for example, two or three, unless the context clearly indicates otherwise.

Figure 4:
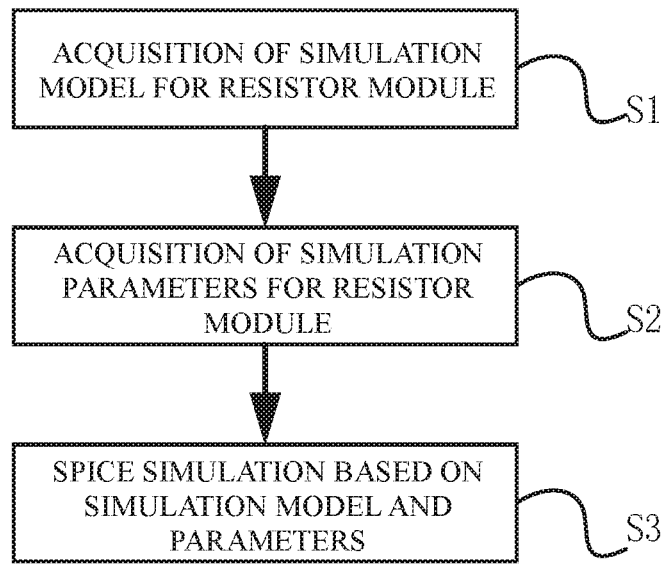
FIG. 4 is a schematic flowchart of a simulation method according to an embodiment of the present invention.
Figure 5:
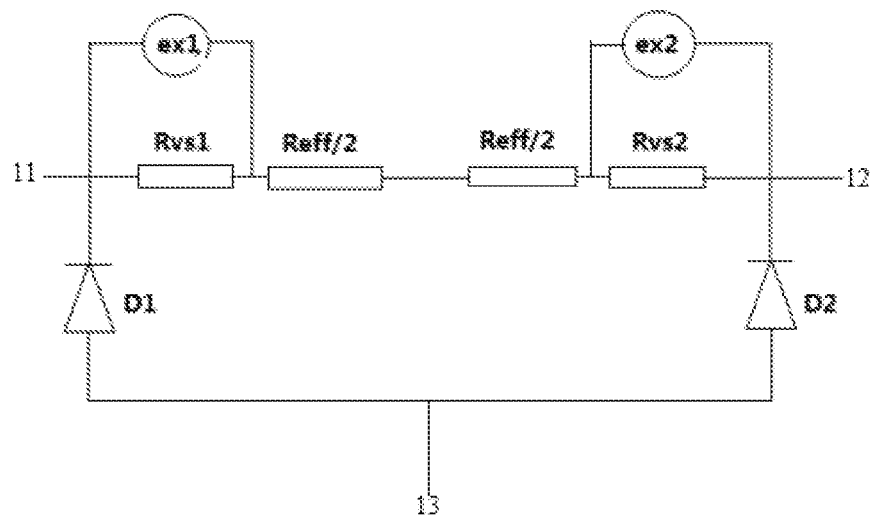
FIG. 5 shows an equivalent circuit of a simulation model according to an embodiment of the present invention.

As shown in FIGS. 4 and 5, in embodiments of the present invention, there is proposed a simulation method for establishing a simulation model for a resistor module in a SPICE simulation system. The simulation method includes the steps of:

S1) acquiring the simulation model for the resistor module, the simulation model including a first resistor, a second resistor, a first parasitic diode D1, a second parasitic diode D2 and a correction circuit, the first and second resistors configured to simulate resistors in the resistor module, the first and second parasitic diodes D1, D2 configured to simulate parasitic diodes of an n-buried layer for a p-well in the resistor module, the correction circuit configured to simulate the body effect on the resistor module;

S2) acquiring simulation parameters for the resistor module; and

S3) performing a SPICE simulation based on the simulation model and the simulation parameters.

This differs from the prior art in adding a correction circuit to the equivalent circuit model for the three-terminal circuit employed in the SPICE simulation system, which allows simulation of the body effect on the resistor module and thus enables the SPICE simulation system to reflect how the resistor behaves with the body effect. In this way, the simulation results obtained based on the simulation model and simulation parameters of the resistor module can better reflect the body effect on a resistor in an actual circuit, resulting in effectively improved simulation accuracy of the SPICE simulation system and allowing the system to provide more accurate circuit simulation results.

It is to be noted that, if the simulated circuit includes another component than the resistors, the simulation method may further include acquiring a simulation model and simulation parameters for the other component.

Optionally, in S1, the correction circuit may particularly include a first correction resistor Rvs1, a second correction resistor Rvs2, a first voltage supply ex1 and a second voltage supply ex2. Wherein: the first correction resistor Rvs1, the first resistor, the second resistor and the second correction resistor Rvs2 are connected sequentially in series to form a series circuit; the first voltage supply ex1 is connected in parallel to the first correction resistor Rvs1, and the second voltage supply ex2 is connected in parallel to the second correction resistor Rvs2; and the first parasitic diode D1 and the second parasitic diode D2 are connected to respective ends of the series circuit.

Optionally, in S2, the simulation parameters may particularly include a first correction coefficient, a second correction coefficient and a third correction coefficient. Wherein: the first correction coefficient is a first-order voltage correction coefficient for a body voltage of the resistor module, the second correction coefficient is a second-order voltage correction coefficient for the body voltage of the resistor module, and the third correction coefficient is a resistor-width-dependent correction coefficient for the body voltage of the resistor module; and the first, second and third correction coefficients are obtained from a fitting test.

Figure 6:
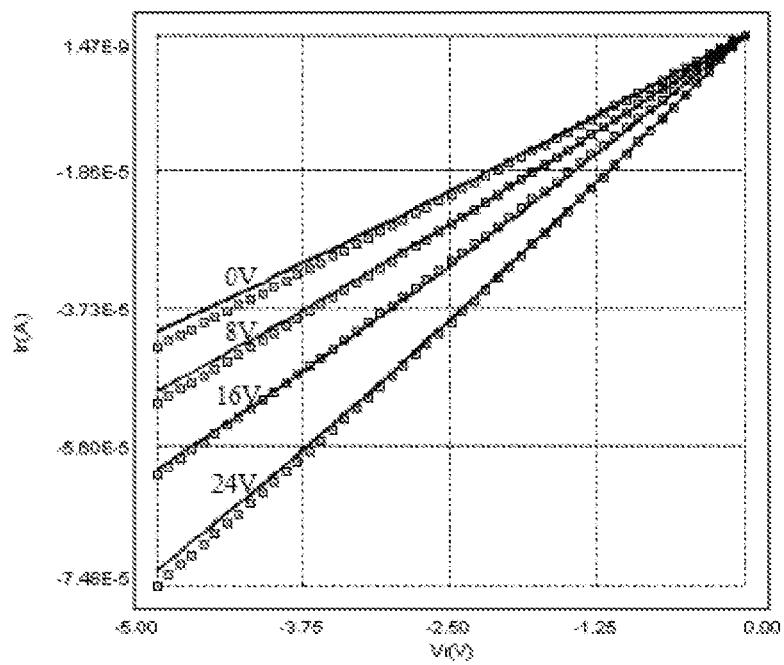
FIG. 6 schematically illustrates a comparison between simulation data of a modified equivalent circuit and actual measurement data.

In practice, the SPICE simulation system may perform fitting test based on respective comparisons between actual measurement data and simulation data to progressively refine and fit the first, second and third correction coefficients so that simulation data fitting the actual measurement data as closely as possible can be obtained, as shown in FIG. 6.

Optionally, the resistor module may be a p-well resistor having a first terminal 11, a second terminal 12 and a third terminal 13. In this case, the first terminal 11 may serve as a high-voltage bias terminal of the p-well resistor, the second terminal 12 may serve as a low-voltage bias terminal of the p-well resistor, and the third terminal 13 may serve as an n-isolated terminal of the p-well resistor.

The first voltage supply ex1 may provide a voltage satisfying $$ex_1 = (1 + p_1 * \max(abs(v(3,1)), abs(v(3,2))) * (1 - p_3/w^2) + p_2 * \max(abs(v(3,1)), abs(v(3,2)))^2 * (1 - p_3/w^2) * (1 - p_3/w^2)),$$

where, $ex_1$ represents the voltage of the first voltage supply ex1; $p_1$ represents the first correction coefficient; $p_2$ represents the second correction coefficient; $p_3$ represents the third correction coefficient; w represents a p-well width in the p-well resistor layout; $v(3,1)$ represents a voltage difference between the third terminal 13 and the first terminal 11; and $v(3,2)$ represents a voltage difference between third terminal 13 and the second terminal 12.

The present invention provides an approach for establishing a three-terminal circuit model for a p-well resistor, in which voltage-controlled resistors, i.e., the first and second correction resistors Rvs1, Rvs2 are so added as to be connected in series with the resistor's first and second terminals 11, 12, respectively. The voltage-controlled resistors are provided with respective independent voltage supplies for voltage control, i.e., the first and second voltage supplies ex1, ex2, which are respective dependent on the voltage difference between the first and third terminals 11, 13 and the voltage difference between the first and second terminals 11, 12. In addition, a mathematic formula expressing the dependence of the voltage-controlling voltage supplies of the voltage-controlled resistors on the voltage differences between the first and third terminals 11, 13 and between the first and second terminals 11, 12 is established and voltage correction coefficients that can be fitted are provided in order to better reflect how the resistor's behavior varies with the body voltage.

Specifically, an equivalent circuit obtained by applying circuit modifications to the conventional resistor equivalent model may be as shown in FIG. 5, in which correction resistor coefficients p1 and p2 are added to the circuit and voltage-controlling voltage signal sources ex1, ex2 are connected parallel to the resistors. In the circuit, ex1, ex2 are dependent on the voltage differences between the first and third terminals 11, 13 and the voltage differences between the second and third terminals 12, 13, and the voltage at ex1 is equal to $$(1 + p_1 * \max(abs(v(3,1)), abs(v(3,2))) * (1 - p_3/w^2) + p_2 * \max(abs(v(3,1)), abs(v(3,2)))^2 * (1 - p_3/w^2) * (1 - p_3/w^2)).$$

It is to be noted that the voltage of the second voltage supply ex2 may be equal to that of the first voltage supply ex1, while the resistances of the first and second correction resistors Rvs1, Rvs2 should be adjusted based on a bias voltage of the resistor module.

Figure 1:
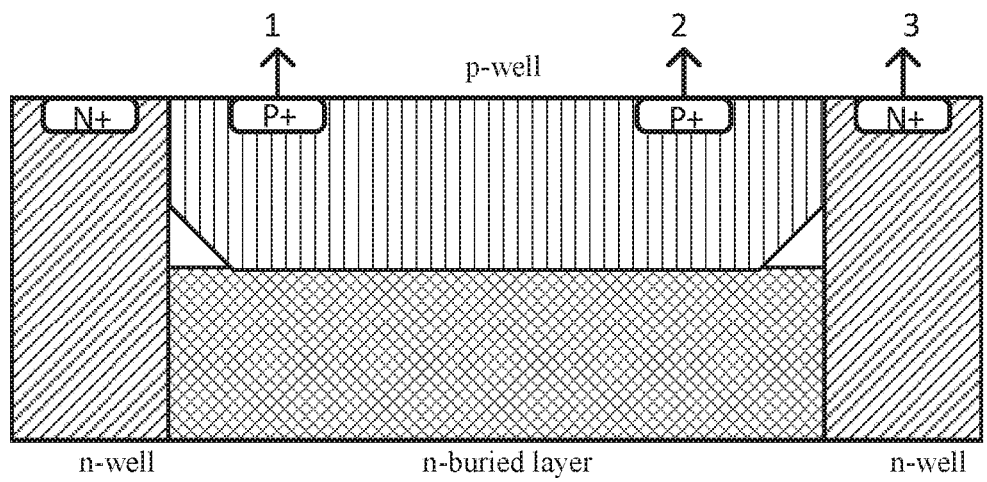
FIG. 1 shows a structural layout of a p-well resistor of the prior art.
Figure 2:
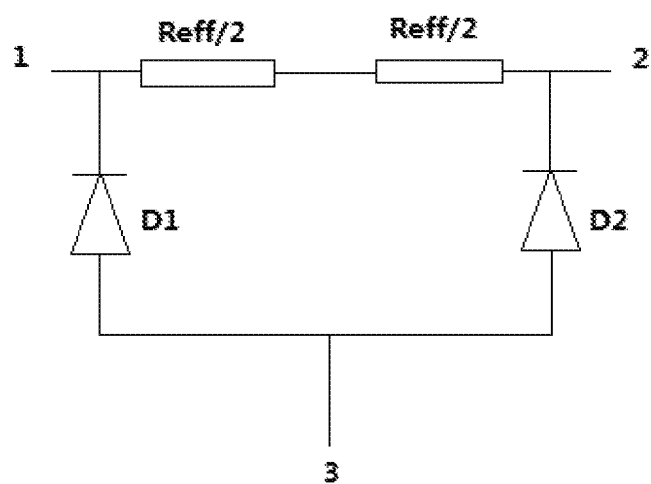
FIG. 2 shows an equivalent circuit of a simulation model of the prior art.
Figure 3:
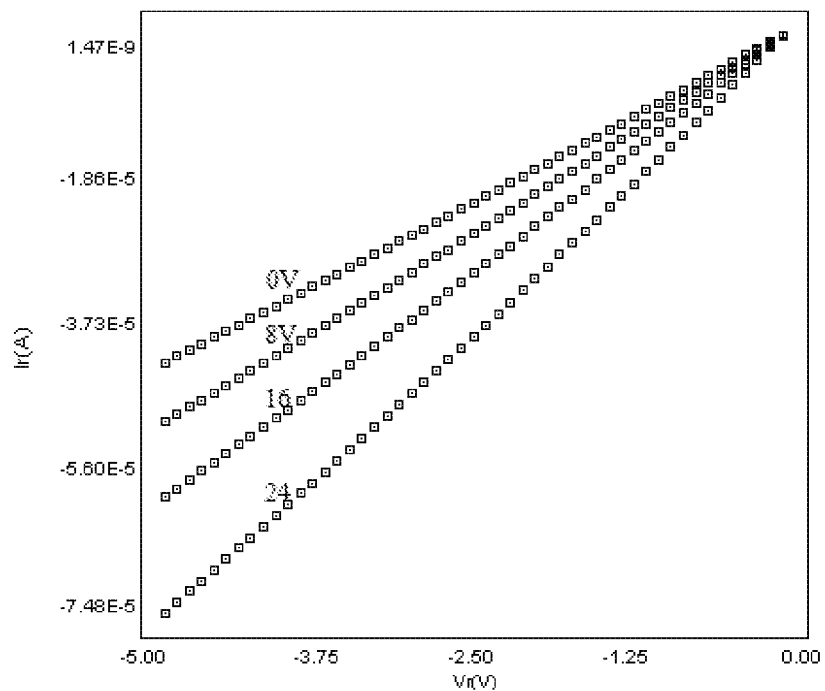
FIG. 3 schematically illustrates how I-V properties of the p-well resistor depend on the body effect of the prior art.

FIG. 6 shows a comparison between the actual measurement data of FIG. 3 and simulation data obtained at the parameters $p_1$, $p_2$ and $p_3$ that have been refined in fitting tests using the modified equivalent circuit model. In FIG. 6, the dotted lines represent the actual measurement data, and the solid lines represent the simulation data. As can be seen, the simulation data obtained according to the embodiment of the present invention can better reflect how the resistor behaves with the body voltage Vs, with the model provides good accuracy.

Figure 7:
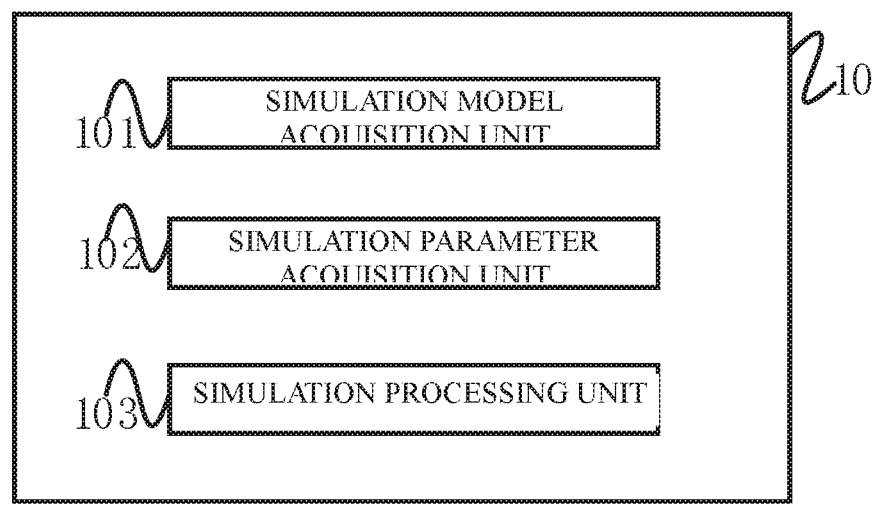
FIG. 7 is a schematic illustration of a simulation device according to another embodiment of the present invention.

In embodiments of the present invention, there is also provided a simulation device 10 for establishing a simulation model for a resistor module in a SPICE simulation system. As shown in FIG. 7, the simulation device includes:

a simulation model acquisition unit 101 for acquiring the simulation model for the resistor module, the simulation model including a first resistor, a second resistor, a first parasitic diode D1, a second parasitic diode D2 and a correction circuit, the first and second resistors configured to simulate resistors in the resistor module, the first and second parasitic diodes D1, D2 configured to simulate parasitic diodes of an n-buried layer for a p-well in the resistor module, the correction circuit configured to simulate the body effect on the resistor module;

a simulation parameter acquisition unit 102 for acquiring simulation parameters for the resistor module; and a simulation processing unit 103 for performing a SPICE simulation based on the simulation model and the simulation parameters.

Optionally, the simulation parameter acquisition unit 102 may be configured to acquire a first correction coefficient, a second correction coefficient and a third correction coefficient, wherein: the first correction coefficient is a first-order voltage correction coefficient for a body voltage of the resistor module, the second correction coefficient is a second-order voltage correction coefficient for the body voltage of the resistor module and the third correction coefficient is a resistor-width-dependent correction coefficient for the body voltage of the resistor module; and the first, second and third correction coefficients are obtained from a fitting test.

In embodiments of the present invention, there is also provided a simulation device including a memory, a processor and a computer program stored on the memory and enable to run on the processor. When executing the computer program, the processor carries out the simulation method as defined above.

In embodiments of the present invention, there is also provided readable storage medium storing thereon a computer program. When the computer program is executed by a processor, the simulation method as defined above is carried out.

Different from the prior art, in the proposed simulation method, simulation devices and readable storage medium, a correction circuit is added to an equivalent circuit model for a three-terminal circuit employed in a SPICE simulation system. The correction circuit enables simulating behavior of the resistor module in the presence of the body effect, enabling the SPICE simulation system to take in account the body effect. Therefore, simulation results obtained from the simulation model and simulation parameters for the resistor module can better reflect resistor behavior with body effect in an actual circuit, resulting in effectively improved simulation accuracy of the SPICE simulation system and allowing the system to provide more accurate circuit simulation results.

Moreover, fitting tests can be performed to obtain a first-order voltage correction coefficient, a second-order voltage correction coefficient and a resistor-width-dependent correction coefficient for a body voltage of the resistor module. In this way, dependence of resistor behavior on the body voltage can be better predicted, allowing a good reflection of resistor behavior with body effect.

As used herein, the terms "one embodiment", "some embodiment", "an example", "a specific example" and the like mean that specific features, structures, materials or characteristics described in combination with the embodiment or example are included in at least one embodiment or example of the present invention. In this specification, the schematic representations of the above terms do not necessarily refer to the same embodiment or example. Furthermore, the specific features, structures, materials, or characteristics described may be combined in any suitable manner in any one or more of the embodiments or examples. In addition, those skilled in the art may combine and assemble different embodiments or examples described in this specification.

Presented above are merely a few preferred embodiments of the present invention, which do not limit the invention in any way. Changes in any forms made to the principles and teachings disclosed herein, including equivalents and modifications, by any person of ordinary skill in the art without departing from the scope of the invention are intended to fall within the scope of the invention.

What is claimed is:

1. A simulation method for establishing a simulation model for a resistor module in a SPICE simulation system, the simulation method comprising the steps of:

S1) acquiring a simulation model for the resistor module, the simulation model comprising a first resistor, a second resistor, a first parasitic diode, a second parasitic diode and a correction circuit, the first and second resistors configured to simulate resistors in the resistor module, the first and second parasitic diodes configured to simulate parasitic diodes of an n-buried layer for a p-well in the resistor module, the correction circuit configured to simulate a body effect on the resistor module;

S2) acquiring simulation parameters for the resistor module; and

S3) performing a SPICE simulation based on the simulation model and the simulation parameters, wherein in S1): the correction circuit comprises a first correction resistor, a second correction resistor, a first voltage supply and a second voltage supply;

the first correction resistor, the first resistor, the second resistor and the second correction resistor are connected sequentially in series to form a series circuit;

the first voltage supply is connected in parallel to the first correction resistor, and the second voltage supply is connected in parallel to the second correction resistor; and the first parasitic diode and the second parasitic diode are connected to respective ends of the series circuit.

2. The simulation method of claim 1, wherein in S2): the simulation parameters comprise a first correction coefficient, a second correction coefficient and a third correction coefficient;

the first correction coefficient is a first-order voltage correction coefficient for a body voltage of the resistor module, the second correction coefficient is a second-order voltage correction coefficient for the body voltage of the resistor module, and the third correction coefficient is a resistor-width-dependent correction coefficient for the body voltage of the resistor module; and the first, second and third correction coefficients are obtained from a fitting test.

3. The simulation method of claim 2, wherein the resistor module is a p-well resistor having a first terminal, a second terminal and a third terminal, the first terminal serving as a high-voltage bias terminal of the p-well resistor, the second terminal serving as a low-voltage bias terminal of the p-well resistor, the third terminal serving as an n-isolated terminal of the p-well resistor, and wherein the first voltage supply is configured to provide a voltage satisfying:

$$ex_1=(1+p_1*\max(abs(v(3,1)),abs(v(3,2)))*(1-p_3/w^2)+p_2*\max(abs(v(3,1)),abs(v(3,2)))^2*(1-p_3/w^2)*(1-p_3/w^2))$$

where $ex_1$ represents the voltage provided by the first voltage supply; $p_1$ represents the first correction coefficient; $p_2$ represents the second correction coefficient; $p_3$ represents the third correction coefficient; w represents a width of a layout of the p-well in the p-well resistor; v(3,1) represents a voltage difference between the third and first terminals; and v(3,2) represents a voltage difference between the third and second terminals.

4. The simulation method of claim 3, wherein the second voltage supply is configured to provide a voltage equal to the voltage provided by the first voltage supply.

5. The simulation method of claim 2, wherein in the SPICE simulation system, the fitting test is performed based on respective comparisons between actual measurement data and simulation data to refine the first, second and third correction coefficients until the simulation data become the same as the respective actual measurement data.

6. The simulation method of claim 1, wherein resistances of the first and second correction resistors are adjusted based on a magnitude of a bias voltage of the resistor module.

7. A simulation device for establishing a simulation model for a resistor module in a SPICE simulation system, the simulation device comprising:

a simulation model acquisition unit for acquiring a simulation model for the resistor module, the simulation model comprising a first resistor, a second resistor, a first parasitic diode, a second parasitic diode and a correction circuit, the first and second resistors configured to simulate resistors in the resistor module, the first and second parasitic diodes configured to simulate parasitic diodes of an n-buried layer for a p-well in the resistor module, the correction circuit configured to simulate a body effect on the resistor module;

a simulation parameter acquisition unit for acquiring simulation parameters for the resistor module; and a simulation processing unit for performing a SPICE simulation based on the simulation model and the simulation parameters, wherein the correction circuit comprises a first correction resistor, a second correction resistor, a first voltage supply and a second voltage supply;

the first correction resistor, the first resistor, the second resistor and the second correction resistor are connected sequentially in series to form a series circuit;

the first voltage supply is connected in parallel to the first correction resistor, and the second voltage supply is connected in parallel to the second correction resistor; and the first parasitic diode and the second parasitic diode are connected to respective ends of the series circuit.

8. The simulation device of claim 7, wherein the simulation parameter acquisition unit is configured to acquire a first correction coefficient, a second correction coefficient and a third correction coefficient, wherein the first correction coefficient is a first-order voltage correction coefficient for a body voltage of the resistor module, the second correction coefficient is a second-order voltage correction coefficient for the body voltage of the resistor module, and the third correction coefficient is a resistor-width-dependent correction coefficient for the body voltage of the resistor module; and wherein the first, second and third correction coefficients are obtained from a fitting test.

* * * * *